(12) United States Patent
Takano

(10) Patent No.: US 6,985,666 B2
(45) Date of Patent: Jan. 10, 2006

(54) METHOD FOR COUPLING PLASTIC OPTICAL FIBERS

(75) Inventor: Yoshinobu Takano, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 455 days.

(21) Appl. No.: 10/073,910

(22) Filed: Feb. 14, 2002

(65) Prior Publication Data

US 2002/0118945 A1    Aug. 29, 2002

(30) Foreign Application Priority Data

Feb. 28, 2001    (JP)    ............................. 2001-055169

(51) Int. Cl.
*G02B 6/00*    (2006.01)
(52) U.S. Cl. .......................... 385/137; 385/53; 385/97; 385/98; 385/99
(58) Field of Classification Search ............ 385/95–99, 385/114, 65, 83, 136, 137, 53
See application file for complete search history.

(56) References Cited

U.S. PATENT DOCUMENTS

| | | | |
|---|---|---|---|
| 3,768,146 A * | 10/1973 | Braun et al. ................... 29/460 |
| 4,629,284 A | 12/1986 | Malavieille ............... 385/95 X |
| 4,662,713 A * | 5/1987 | Davies et al. ................. 385/73 |
| 4,662,962 A * | 5/1987 | Malavieille .................. 156/158 |
| 4,779,954 A | 10/1988 | Tatsukami et al. ....... 385/141 X |
| 4,871,227 A | 10/1989 | Tilse ........................ 385/95 X |
| 4,973,126 A * | 11/1990 | Degani et al. ................. 385/55 |
| 5,134,673 A * | 7/1992 | Stephenson et al. .......... 385/56 |
| 5,195,153 A | 3/1993 | Finzel ......................... 385/70 |
| 5,400,426 A * | 3/1995 | de Jong et al. ............... 385/95 |
| 5,638,477 A * | 6/1997 | Patterson et al. ............. 385/99 |
| 5,692,089 A | 11/1997 | Sellers ....................... 385/137 |
| 5,694,506 A * | 12/1997 | Kobayashi et al. ........... 385/60 |
| 5,760,139 A | 6/1998 | Koike et al. ................. 525/200 |
| 5,783,636 A | 7/1998 | Koike et al. ................. 525/199 |
| 5,916,971 A | 6/1999 | Koike et al. ................. 525/197 |
| 5,930,438 A | 7/1999 | Palmskog et al. .......... 385/129 |
| 5,963,699 A * | 10/1999 | Tanaka et al. ................ 385/97 |
| 6,071,441 A | 6/2000 | Koganezawa et al. ..... 264/1.24 |
| 6,074,511 A | 6/2000 | Takano et al. ........... 156/304.2 |
| 6,111,062 A | 8/2000 | Shirota et al. .............. 528/402 |
| 6,166,125 A | 12/2000 | Sugiyama et al. .......... 324/402 |
| 6,193,421 B1 * | 2/2001 | Tamekuni et al. ............ 385/65 |
| 6,221,987 B1 | 4/2001 | Sugiyama .................... 526/231 |
| 6,225,382 B1 | 5/2001 | Matsukura et al. ......... 524/100 |
| 6,254,280 B1 * | 7/2001 | Hubbauer et al. ............ 285/65 |
| 6,271,312 B1 | 8/2001 | Koike et al. ................. 525/199 |

(Continued)

FOREIGN PATENT DOCUMENTS

CN    1229476 A    9/1999

(Continued)

OTHER PUBLICATIONS

Patent Abstracts of China, CN 1257212A, Dec. 14, 1998.

*Primary Examiner*—Brian M. Healy
(74) *Attorney, Agent, or Firm*—Oblon, Spivak, McClelland, Maier & Neustadt, P.C.

(57) ABSTRACT

A method for coupling plastic optical fibers and a plastic optical fiber unit are provided by providing a holder, which includes a groove for holding plastic optical fibers in a longitudinal direction; and abutting and coupling opposed end faces of the plastic optical fibers together while causing the holder to apply a lateral pressure to the plastic optical fibers therein to sandwich the plastic optical fibers.

23 Claims, 1 Drawing Sheet

U.S. PATENT DOCUMENTS

| | | | |
|---|---|---|---|
| 6,325,549 B1 * | 12/2001 | Shevchuk | 385/86 |
| 6,343,879 B1 * | 2/2002 | Lesueur et al. | 385/99 |
| 6,350,065 B1 * | 2/2002 | Arima | 385/95 |
| 6,448,452 B2 | 9/2002 | Kashiwagi et al. | 568/683 |
| 2002/0118945 A1 * | 8/2002 | Tanako | 385/137 |

FOREIGN PATENT DOCUMENTS

| | | |
|---|---|---|
| EP | 0 065 096 | 11/1982 |
| JP | 8-5848 | 1/1996 |
| WO | WO98/12585 A1 | 3/1998 |

* cited by examiner

METHOD FOR COUPLING PLASTIC OPTICAL FIBERS

The present invention relates to a method for coupling end faces of plastic optical fibers, and a plastic optical fiber unit obtainable by the method.

Optical fibers for communication, most of which are made of silica, have needed to be molten and coupled (be subjected to melt-splice) by use of an extremely high temperature provided by discharge since the silica has a high melting point. However, the discharging operation at a minute portion in as a leading end of an optical fiber has required significantly high control accuracy and a heavy device for carrying out the discharging operation at an installation site.

In order to solve this problem, there has been proposed a mechanical splice, wherein a holder has a V-shaped groove formed therein, two optical fibers are abutted together in alignment in the groove, the holder is closed from upward by a cover, and the cover is sandwiched with a clip to fix the optical fibers.

However, it has been difficult to make an end face of a silica member a plane perpendicular to a longitudinal direction only by cutting the silica member. Splice loss has been great in abutting cut end faces of a silica member without subjecting to a special treatment. Although an end face of a silica member can be made a smooth plane perpendicular to an optical axis by being polished, many complicated and costly steps have been required, which has been demanded to be improved.

In order to introduce optical fibers into the mechanical splice, the optical fibers have been required to be abutted together on the holder with the cover opened, or the cover have been required to be lifted from the groove by a wedge with the holder and the cover assembled since optical fibers made of silica are thin and fragile. When an optical fiber is forcibly introduced between the groove and the cover sandwiched by the clip without using a wedge, the optical fiber has been snapped.

For these reasons, three parts of two optical fibers and a wedge have been simultaneously handled in coupling. The coupling has needed a tool for holding the wedge. There has been proposed no method capable of carrying out the coupling by a hand and a simple tool.

It is an object of the present invention to provide a method for coupling end faces of plastic optical fibers in easy fashion and with low splice loss, and an optical fiber unit having a coupled portion provided by the method.

1. The present invention provides a method for coupling plastic optical fibers, comprising providing a holder, which includes a groove for holding plastic optical fibers in a longitudinal direction; and abutting and coupling opposed end faces of the plastic optical fibers together while causing the holder to apply a lateral pressure to the plastic optical fibers therein to sandwich the plastic optical fibers. The method according to the present invention can make the coupling simple and minimize splice loss.

The present invention also provides a method for coupling resin plastic fibers and a plastic optical fiber unit stated below.

2. A method for coupling plastic optical fibers recited in item 1, wherein the groove of the holder has openings at opposite ends of the holder, the openings have inclined portions, and the opposed end faces of the respective plastic optical fibers are abutted and coupled together by introducing opposed ends of the plastic optical fibers from the openings into the groove in the holder through the inclined portions by use of flexibility of the holder with the lateral pressure preliminarily applied thereto.

3. A method recited in item 1 or 2, wherein the groove can encompass a cylindrical space occupying 50% or more of an entire outer circumference of each of the plastic optical fibers.

4. A method recited in any one of items 1–3, wherein at least one portion of the plastic optical fibers is made of fluororesin.

5. A method recited in any one of items 1–4, wherein the opposed end faces of the plastic optical fibers are abutted and coupled together with a refractive index matching agent interposed therebetween.

6. A plastic optical fiber unit including a coupled portion, the coupled portion formed by providing a holder, which includes a groove for holding plastic optical fibers in a longitudinal direction; and abutting opposed end faces of plastic optical fibers while causing the holder to apply a lateral pressure to the plastic optical fibers therein to sandwich the plastic optical fibers.

The plastic optical fibers employed in the present invention may be jacketted silica fiber or jacketted multicomponent glass fiber as long as 50% or more of portions thereof is made of plastic material in section. A jacketted optical fiber or a bare optical fiber made of only plastic is preferable. The jacketted optical fiber made of only plastic is a bare optical fiber covered by a covering plastic material. There is no limitation on the covering material. Thermoplastic resin, which is usually employed to cover such a jacketted fiber, may be employed. Examples are polyethylene, polyvinyl chloride, polymethyl methacrylate, and an ethylene-tetrafluoroethylene copolymer. The plastic optical fibers are excellent in flexibility and are employed as a short distance of back-bone in a building after lead-in from a trunk cable, a branch cable or a line cable for a LAN system.

Examples of the optical fiber are one made of fluororesin, one made of polymethyl methacrylate (PMMA) resin, and polycarbonate resin. Among them, one made of fluororesin or the one made of PMMA resin is preferable in terms of excellent communication performance. As the fluororesin, an amorphous fluorine-containing polymer having substantially no C—H bond is preferable. In particular, the plastic optical fiber that is disclosed in JP-A-8-5848 and is made of fluororesin is effective as a plastic optical fiber for middle distance communication since the optical fiber is excellent in transmission properties in near infrared light, which has not been obtained by conventional plastic optical fibers made of PMMA resin. Additionally, the plastic optical fibers disclosed in that publication is excellent in terms of difficulty in snapping.

Although there is no particular limitation on the thickness of the plastic optical fibers employed in the present invention, optical fibers having a diameter of 300 µm or more are appropriate since such optical fibers are difficult to be bent in introduction. A diameter from not less than 450 µm to not greater than 1.5 mm is further preferable. This is because a plastic optical fiber unit having a coupled portion provided by the coupling method according to the present invention can minimize transmission loss, and the coupling method is simple and efficient as long as the diameter is in such a range.

The end surfaces of plastic optical fibers that are abutted together are preferably perpendicular to the optical axis (the longitudinal direction of the fibers). In other words, the end faces that are perpendicular to the optical transmission direction of the respective plastic optical fibers are preferably abutted together. The end faces of the plastic optical fibers are abutted together in a state that the end faces are in contact with each other, or in a state that the end faces are enough close to be able to prevent splice loss from substantially increasing. For example, an end face perpendicular to an optical axis can be obtained by fixing a plastic optical fiber on a table and cutting an end portion of the fiber with a sharp razor.

The holder employed in the present invention may be formed in any shape as long as the holder has a groove for holding plastic optical fibers in the longitudinal direction. For example, the holder may be formed in a prismatic or cylindrical shape and have a hole in a transverse section, which can properly hold plastic optical fibers. In particular, it is preferable that the holder comprises a plurality of parts. It is further preferable that the holder comprises a lower holder including a groove for holding plastic optical fibers in the longitudinal direction, and a cover for urging (pressing) the held plastic optical fiber against the lower holder.

There is no limitation on the urging mechanism. Examples of the urging mechanism are a combination of a projection and a recess wherein one of them is formed on the lower holder and the other is formed on the cover, a hinge or a spring which is provided between the lower holder and the cover, and a clip or a rubber band which is provided as a separate part from the lower holder and the cover. Plastic optical fibers may be held and urged by forming at least one portion of the lower holder or the cover from an elastic material, and combining the lower holder and the cover by integral molding, bonding, engagement coupling and the like.

The groove of the lower holder may be formed in any shape as long as the groove can hold the plastic optical fibers in the longitudinal direction. The groove may be a cylindrical hole formed in the holder. When the holder comprises a plurality of parts, the groove is preferably a groove that is formed on an upper surface of a plate-shaped lower holder so as to have a V-shaped section. The groove may have a U-shaped section or a rectangular section.

The coupling method according to a first mode of the present invention is a method for coupling plastic optical fibers, comprising providing a holder, which includes a groove for holding plastic optical fibers in a longitudinal direction; and abutting and coupling opposed end faces of the plastic optical fibers together while causing the holder to apply a lateral pressure to the plastic optical fibers therein to sandwich the plastic optical fibers. In the coupling method, the optical fibers can sufficiently minimize splice loss, even not molten and bonded, since the end faces of the plastic optical fibers are fixed on the holder, being abutted together.

The opposed end faces of the plastic optical fibers may be abutted together with a refractive index matching agent interposed therebetween. The refractive index matching agent is transparent or translucent, is preferably a liquid or gel refractive index matching agent, such as a silicone oil, and is usually preliminarily applied in the groove of the holder. A plastic optical fiber unit, which includes a coupled portion provided by such a coupling method, can minimize transmission loss, reduce cabling costs because of simplification in the coupling process, and be decoupled and recoupled after preliminarily coupling.

The coupling method according to a second mode of the present invention is a method for coupling plastic optical fibers comprises providing a holder, which includes a groove for holding plastic optical fibers in a longitudinal direction; and abutting and coupling opposed end faces of the plastic optical fibers together while causing the holder to apply a lateral pressure to the plastic optical fibers therein to sandwich the plastic optical fibers, wherein the groove of the holder has openings at opposite ends of the holder, the openings have inclined portions, and the opposed end faces of the respective plastic optical fibers are abutted and coupled together by introducing opposed ends of the plastic optical fibers from the openings into the groove in the holder through the inclined portions by use of flexibility of the holder with the lateral pressure preliminarily applied thereto.

In accordance with the coupling method of the second mode of the present invention, end portions of plastic optical fibers can be simply introduced into the groove in the holder to be coupled at the opposed end faces without the lower holder and the cover being held in a partly opened state by, e.g., a wedge. A plastic optical fiber unit, which has a coupled portion provided by this coupling method, can also restrain splice loss at a low level.

It is sufficient that each of the inclined portions is configured to have such an inclined surface that the end of the holder and the opening formed thereat do not intersect in linear fashion. The inclined surface may have a curved shape that is provided by slightly smoothly chamfering the edge of the opening, the inclined surface or may be configured to have a certain angle. When the holder comprises a plurality of parts, i.e., the lower holder and the cover, the inclined portions may be provided not only on the ends of the lower holder but also on locations of the cover corresponding to the open edges of the groove formed in the lower holder.

When it is not easy to introduce a plastic optical fiber from an end of the groove, a refractive index matching agent providing a good slide, such as silicone, may be applied to the plastic optical fiber or the inclined portion at that end before introducing the plastic optical fiber. It is preferable that the groove can encompass a cylindrical space occupying 50% or more of an entire outer circumference of the plastic optical fiber. In other words, the sectional area of the groove (the sectional area of the space defined by the groove and a cover in the case wherein the holder comprises the lower holder with the groove and the cover) preferably encompasses a circular sectional area occupying 50% or more of the sectional area of a plastic optical fiber. A more preferable range is 70–98%, and a further preferable range is 80–95%.

Figure 1:
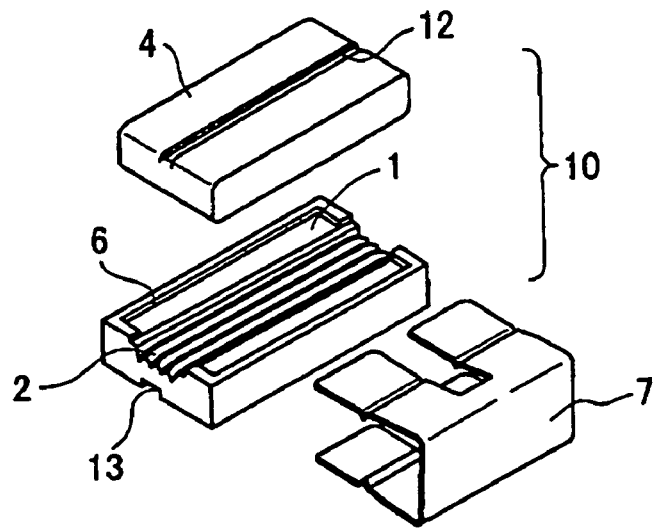
FIG. 1 is an exploded perspective view of a fiber coupler 10 having a V-shaped groove, employed in an example of the present invention.
Figure 2:
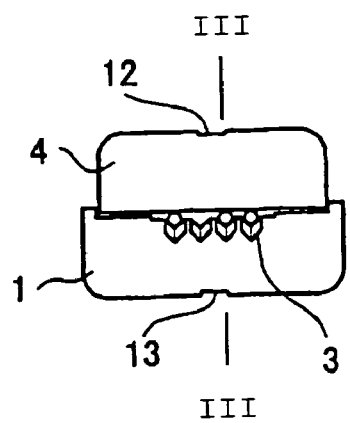
FIG. 2 is a front view of the fiber coupler.
Figure 3:
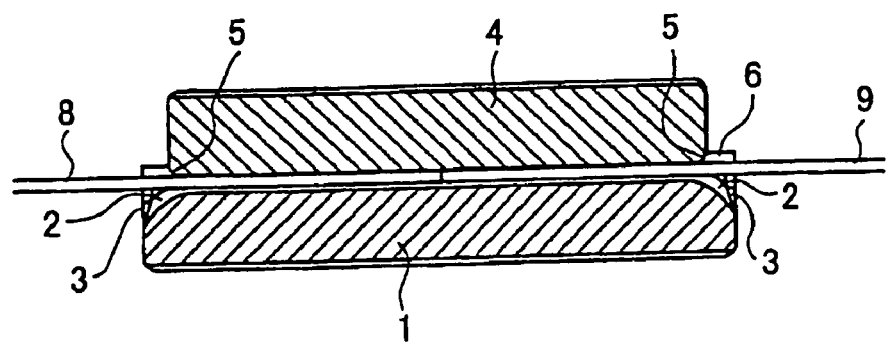
FIG. 3 is a sectional view of the fiber coupler taken from line III—III of FIG. 2.

Now, a process of the coupling method according to the present invention will be described in reference to the accompanying drawings. The present invention is not limited to the embodiment shown in the drawings. FIG. 1 is an exploded perspective view of a fiber coupler 10 having a V-shaped groove as an example of the holder employed in the coupling method according to the present invention, FIG. 2 is a front view of the fiber coupler 10, and FIG. 3 is a sectional view of the fiber coupler taken from line III—III of FIG. 2.

A lower holder 1 has a V-shape groove 2 having a V-shaped section cut in an upper surface so as to extend in a longitudinal direction of the upper surface. The V-shape groove 2 may be single or comprise a plurality of grooves. It is preferable that the lower holder 1 has a ridge 6 formed by edges at four sides of the upper surface. Since a cover 4 is combined with the lower holder 1 inside the ridge 6, the cover can be located in contact with outer circumferences of plastic optical fibers so as to hold the plastic optical fibers in reliable fashion even if the outer diameter of a plastic optical fiber put in the groove 2 is greater than that of the groove. It is preferable that the cover 4 has opposite ends provided with inclined portions 5, and the groove 2 has opposite ends provided with inclined portions 3 in order to make introduction of the plastic optical fibers smooth. It is preferable that one portion of the lower holder 1 or the cover 4 is made of an elastic material, such as rubber. When, for instance, a contacting portion of the groove 2 with the plastic optical fibers is made of rubber, the elasticity conveniently allows the plastic optical fibers to be held therein in reliable fashion.

The lower holder 1 and the cover 4 are urged from a direction perpendicular to the longitudinal direction of the groove 2 by being sandwiched with a clip 7. It is preferable that the cover 4 and the lower holder 1, respectively, have an upper surface and a lower surface formed with a central recess 12 and a central recess 13 in the longitudinal direction of the upper surface and the lower surface. This arrangement can prevent the cover 4 or the lower holder 1 from slipping during handling, making the handling easy by location at proper positions, and make the handling easy even after both members have been assembled. When the clip 7 has projections formed thereon so as to be engageable with the central recess 12 and the central recess 13, the clip 7 can be conveniently held without being slipped out of the fiber coupler 10.

The fiber coupler 10 as the holder employed in the present invention may be assembled by removing the cover 4 from the lower holder 1, applying a refractive index matching agent in the groove 2, putting the cover 4 on the lower holder 1 and sandwiching the cover 4 and the lower holder 1 with the clip 7. Opposed end faces of plastic optical fibers 8 and 9, which have been subjected to smooth treatment, can be coupled by a simple process wherein the end of one of the plastic optical fibers and the opposed end of the other plastic optical fiber are introduced up to a location near to the center of the fiber coupler 10 through the inclined portions 3, 5 and are abutted together at that location, preferably with the fiber coupler 10 being assembled. The cover 4 is preferably transparent or translucent so as to make the coupled position of plastic optical fibers visible. The material of the cover 4 may be resin or glass.

When it is not necessary to suppress splice loss at a low level in particular, the refractive index matching agent may be omitted. When it is not easy to introduce the fibers 8, 9 because of a poor slide of the fibers 8, 9 into the fiber coupler 10, a silicone substance providing a good slide or another substance may be employed as the refractive index matching agent. A two component adhesion, an ultraviolet cure adhesion and another adhesion may be employed as the refractive index matching agent. In that case, the clip 7 may be omitted after bonding.

When the refractive index matching agent contains bubbles, splice loss increases in hot environment in some cases. When a two component adhesion is employed, it is preferable to restrain bubbles from generating in mixture by using one that the two components are independently sealed in two adjacent sealed bags, and the two components can be kneaded by connecting the bags. Waiting for bubbles to disappear, or depressurizing to eliminate bubbles quicker is applicable. It is applicable that two components are independently introduced into two cylinders, the two cylinders have leading edges provided with a static mixer, and the two components are mixed at the same time as the two components are pushed out of the cylinders.

The lower holder 1 and the cover 4 are preferably made of plastic because of quantity production by injection molding. When the lower holder 1 and the cover 4 are made of plastic having thermal expansion properties similar to plastic optical fibers, the coupled portion has excellent temperature properties. When an ultraviolet cure adhesion is employed as the refractive index matching agent, the cover 4 is preferably made of glass having a high optical transmittance to ultraviolet light since the adhesive can be cured by a weak light source for a short period of time.

EXAMPLE

Now, an example according to the present invention will be specifically described. It is noted that the explanation should not be used to limit the scope of the present invention.

The lower holder 1 and the cover 4 are fabricated from polycarbonate by injection molding so as to be formed as shown in FIGS. 1–3. The V-shaped groove 2 was set at an opening angle of 60°. The inclined portions 3, 5 for introduction of plastic optical fibers were inclined to main slant planes of the V-shaped groove 2 in contact with the outer circumferences of optical fibers at an angle of 30°, and the inclined portions are formed on both ends of each of the cover 4 and the V-shaped groove 2 of the lower holder 1. The clip 7 was formed from a leaf spring having a thickness of 0.25 mm and made of stainless steel. As the plastic optical fibers 8, 9 were employed plastic optical fibers, which had a central portion made of transparent fluorine-containing resin and a surrounding enforcing layer made of PMMA resin, and having a diameter of 500 $\mu$m (manufactured by Asahi Glass Company, Limited, commercially available under the tradename of Lucina). The space that was defined by the V-shaped groove 2 of the lower holder 1 and the cover 4 for holding the plastic optical fibers in a sectional direction was determined at a distance that a cylindrical space having a diameter of 400 $\mu$m can be encompassed. As the refractive index matching agent, a silicone oil was employed.

The fiber coupler 10 was fabricated, having the structure stated just above.

After the plastic optical fiber was cut by a razor, the cut end faces were polished by a polishing sheet having a grain size of 1 $\mu$m. When the cut fibers were connected by the fiber coupler 10, the splice loss in comparison with before cutting the plastic optical fiber was 0.1 dB. The end portions of the cut optical fibers were able to be introduced into the groove in the fiber coupler 10 through the inclined portions 3, 5 with the lower holder 1 and the cover 4 being sandwiched by the clip 7.

By the use of the flexibility of the holder with a lateral pressure preliminarily applied thereto and the toughness of plastic optical fibers, the plastic optical fibers can be introduced into the groove without using a wedge to open, the groove of the holder, which is located between, e.g., the lower holder and the cover sandwiched by the clip. As a result, a tool for preliminarily holding a wedge is not needed. Coupling with splice loss minimized can be established by abutting and coupling opposed end faces of optical fibers. Additionally, it is easy to carry out permanent coupling after temporary coupling or to exchange an optical fiber with another optical fiber at plural times since optical fibers can be repeatedly introduced into and removed from the holder.

The entire disclosure of Japanese Patent Application No. 2001-55169 filed on Feb. 28, 2001 including specification, claims, drawings and summary are incorporated herein by reference in its entirety.

What is claimed is:

1. A method for coupling plastic optical fibers, comprising:
   providing a holder comprising a groove including openings having inclined portion at opposite ends of the holder configured to hold the plastic optical fibers in a longitudinal direction;
   abutting opposed end faces of the plastic optical fibers together;
   removably disposing a first portion of a clip on a face of the holder and a second portion of the clip on a face of a cover to apply a lateral pressure to the plastic optical fibers therebetween to sandwich the plastic optical fibers; and
   introducing ends of the plastic optical fibers into the groove in the holder through the inclined portions when the clip is disposed to secure the holder against the cover,
   wherein the holder comprises a plurality of protrusions contacting a plurality of sides of the cover, and the cover is disposed within a perimeter defined by the plurality of protrusions.

2. A method for coupling plastic optical fibers, comprising:
   providing a holder comprising a groove including openings having inclined portion at opposite ends of the holder configured to hold the plastic optical fibers in a longitudinal direction;
   abutting opposed end faces of the plastic optical fibers together;
   removably disposing a first portion of a clip on a face of the holder and a second portion of the clip on a face of a cover to apply a lateral pressure to the plastic optical fibers therebetween to sandwich the plastic optical fibers; and
   introducing ends of the plastic optical fibers into the groove in the holder through the inclined portions when the clip is disposed to secure the holder against the cover,
   wherein the groove is configured to encompass a cylindrical space occupying at least 50% of an entire outer circumference of at least one of the plastic optical fibers.

3. The method according to claim 1, wherein at least one of the plastic optical fibers comprises fluororesin.

4. The method according to claim 1, further comprising:
   interposing a refractive index matching agent between the opposed end faces of the plastic optical fibers.

5. The method according to claim 2, wherein the groove is configured to encompass a cylindrical space occupying at least 50% of an entire outer circumference of each of the plastic optical fibers.

6. The method according to claim 1, wherein each of the plastic optical fibers comprises fluororesin.

7. The method according to claim 6, further comprising:
   interposing a refractive index matching agent between the opposed end faces of the plastic optical fibers.

8. A coupling unit comprising:
   a holder comprising a groove including openings having inclined portion at opposite ends of the holder configured to hold plastic optical fibers in a longitudinal direction; and
   a clip including first and second portions, the clip configured to be removably disposed to contact a face of a cover with the first portion and a face of the holder with the second portion to apply a lateral pressure to the plastic optical fibers therebetween to sandwich the plastic optical fibers, and the clip configured to permit introduction of ends of the plastic optical fibers into the groove in the holder through the inclined portions when the clip is disposed to secure the holder against the cover,
   wherein the holder comprises a plurality of protrusions configured to contact a plurality of sides of the cover such that the cover is disposed within a perimeter defined by the plurality of protrusions.

9. A coupling unit comprising:
   a holder comprising a groove including openings having inclined portion at opposite ends of the holder configured to hold plastic optical fibers in a longitudinal direction; and
   a clip including first and second portions, the clip configured to be removably disposed to contact a face of a cover with the first portion and a face of the holder with the second portion to apply a lateral pressure to the plastic optical fibers therebetween to sandwich the plastic optical fibers, and the clip configured to permit introduction of ends of the plastic optical fibers into the groove in the holder through the inclined portions when the clip is disposed to secure the holder against the cover,
   wherein the groove is configured to encompass a cylindrical space occupying at least 50% of an entire outer circumference of at least one of the plastic optical fibers.

10. The unit according to claim 8, further comprising:
    plastic optical fibers, wherein at least one of the plastic optical fibers comprises fluororesin.

11. The unit according to claim 8, further comprising:
    a refractive index matching agent disposed in the groove.

12. The unit according to claim 8, wherein the groove comprises openings at opposite ends of the holder, and the openings have inclined portions.

13. The unit according to claim 12, wherein the groove is configured to encompass a cylindrical space occupying at least 50% of an entire outer circumference of at least one of the plastic optical fibers.

14. The unit according to claim 12, further comprising:
    plastic optical fibers, wherein at least one of the plastic optical fibers comprises fluororesin.

15. The unit according to claim 12, further comprising:
    a refractive index matching agent disposed in the groove.

16. A coupling unit, comprising:
    a holder comprising a groove including openings having inclined portion at opposite ends of the holder configured to receive optical fibers;
    a cover configured to cover the groove of the holder; and
    a removable clip comprising first and second portions configured to urge the holder and the cover together, the first portion configured to contact a surface of the holder and the second portion configured to contact a surface of the cover, the clip configured to permit introduction of ends of the optical fibers into the groove in the holder through the inclined portions when the clip is disposed to secure the holder against the cover,
    wherein the holder comprises a plurality of protrusions contacting a plurality of sides of the cover, and the cover is disposed within a perimeter defined by the plurality of protrusions.

17. The coupling unit according to claim 16, wherein the clip further comprises at least one of a protrusion and a void configured to cooperate with a corresponding void or protrusion of the holder or the cover.

18. The coupling unit according to claim 16, wherein the first and second portions of the clip are configured to contact opposing faces of the holder and the cover.

19. The coupling unit according to claim 16, wherein at least one of the opposing faces of the holder and the cover comprises a protrusion or a void configured to cooperate with a corresponding void or protrusion of the clip.

20. A method for coupling plastic optical fibers, comprising:
providing a holder comprising a groove including openings having inclined portion at opposite ends of the holder configured to hold the plastic optical fibers in a longitudinal direction;
abutting opposed end faces of the plastic optical fibers together;
removably disposing a first portion of a clip on a face of the holder and a second portion of the clip on a face of a cover to apply a lateral pressure to the plastic optical fibers therebetween to sandwich the plastic optical fibers; and
introducing ends of the plastic optical fibers into the groove in the holder through the inclined portions when the clip is disposed to secure the holder against the cover,
wherein the holder comprises a material having thermal expansion properties similar to thermal expansion properties of a material of the plastic optical fibers.

21. A coupling unit comprising:
a holder comprising a groove including openings having inclined portion at opposite ends of the holder configured to hold plastic optical fibers in a longitudinal direction; and
a clip including first and second portions, the clip configured to be removably disposed to contact a face of a cover with the first portion and a face of the holder with the second portion to apply a lateral pressure to the plastic optical fibers therebetween to sandwich the plastic optical fibers, and the clip configured to permit introduction of ends of the plastic optical fibers into the groove in the holder through the inclined portions when the clip is disposed to secure the holder against the cover,
wherein the holder comprises a material having thermal expansion properties similar to thermal expansion properties of a material of the plastic optical fibers.

22. A coupling unit comprising:
a holder comprising a groove including openings having inclined portion at opposite ends of the holder configured to receive optical fibers;
a cover configured to cover the groove of the holder; and
a removable clip comprising first and second portions configured to urge the holder and the cover together, the first portion configured to contact a surface of the holder and the second portion configured to contact a surface of the cover, the clip configured to permit introduction of ends of the optical fibers into the groove in the holder through the inclined portions when the clip is disposed to secure the holder against the cover,
wherein the holder comprises a material having thermal expansion properties similar to thermal expansion properties of a material of the optical fibers.

23. A coupling unit comprising:
a holder comprising a groove including openings having inclined portion at opposite ends of the holder configured to receive optical fibers;
a cover configured to cover the groove of the holder; and
a removable clip comprising first and second portions configured to urge the holder and the cover together, the first portion configured to contact a surface of the holder and the second portion configured to contact a surface of the cover, the clip configured to permit introduction of ends of the optical fibers into the groove in the holder through the inclined portions when the clip is disposed to secure the holder against the cover,
wherein the holder comprises ridges at four edges of an upper surface in which the groove is disposed, and the cover is disposed on the upper surface of the holder within a perimeter defined by the ridges.

* * * * *